(12) United States Patent
Bendersky et al.

(10) Patent No.: US 11,552,943 B2
(45) Date of Patent: Jan. 10, 2023

(54) NATIVE REMOTE ACCESS TO TARGET RESOURCES USING SECRETLESS CONNECTIONS

(71) Applicant: CyberArk Software Ltd., Petach-Tikva (IL)

(72) Inventors: Arthur Bendersky, Petach-Tikva (IL); Dima Barboi, Petach-Tikva (IL); Tal Zigman, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 17/097,809

(22) Filed: Nov. 13, 2020

(65) Prior Publication Data

US 2022/0158992 A1 May 19, 2022

(51) Int. Cl.
*H04L 9/40* (2022.01)

(52) U.S. Cl.
CPC ........ *H04L 63/0853* (2013.01); *H04L 63/029* (2013.01); *H04L 63/10* (2013.01)

(58) Field of Classification Search
CPC .... H04L 63/0853; H04L 63/029; H04L 63/10
See application file for complete search history.

(56) References Cited

U.S. PATENT DOCUMENTS

| 7,360,237 | B2 * | 4/2008 | Engle | H04L 63/0272 709/219 |
| 7,610,491 | B1 * | 10/2009 | Tsao | G06F 21/31 713/184 |
| 7,676,675 | B2 * | 3/2010 | Billharz | H04L 63/104 713/168 |
| 7,912,822 | B2 * | 3/2011 | Bethlehem | H04L 63/102 707/705 |

(Continued)

OTHER PUBLICATIONS

Homeland Security "Configuring and Managing Remote Access for Industrial Control Systems," Control Systems Security Program, National Cyber Security Division, CPNI, Centre for Protection of National Infrastructure, Nov. 2010, pp. 1-66 (Year: 2010).*

(Continued)

*Primary Examiner* — Luu T Pham
*Assistant Examiner* — James J Wilcox
(74) *Attorney, Agent, or Firm* — Finnegan, Henderson, Farabow, Garrett & Dunner, LLP (57) ABSTRACT

Disclosed embodiments relate to systems and methods for securely establishing secretless and remote native access sessions. Techniques include identifying a client configured to participate in remote native access sessions, wherein the client has a remote access protocol file that has been modified to include an identifier associated with the client; sending a prompt to the client to establish a secure tunnel connection with a connection agent using the identifier associated with the client; and authentication the client. The (Continued)

techniques may further include accessing target identity information associated with one or more target resources; receiving from the client a token that identifies a target resource from among the one or more target resources; obtaining, based on the token, a credential required for secure access to the target resource; and initiating, using the credential, a remote native access session between the client and the target resource.

14 Claims, 5 Drawing Sheets

(56) References Cited

U.S. PATENT DOCUMENTS

| | | | | |
|---|---|---|---|---|
| 8,462,677 | B1* | 6/2013 | Gailloux | H04L 67/141 455/410 |
| 8,510,818 | B2* | 8/2013 | Garg | H04L 63/0815 726/8 |
| 8,613,055 | B1* | 12/2013 | Tomilson | G06F 21/00 726/20 |
| 9,009,334 | B1* | 4/2015 | Jenkins | G06F 21/55 709/219 |
| 9,386,021 | B1* | 7/2016 | Pratt | G06F 9/45558 |
| 9,628,448 | B2* | 4/2017 | Hayton | G06F 21/31 |
| 10,069,838 | B2* | 9/2018 | Sanso | H04L 63/104 |
| 10,200,377 | B1* | 2/2019 | Vazquez | H04L 63/0861 |
| 10,277,586 | B1* | 4/2019 | Yau | H04L 63/0807 |
| 10,362,057 | B1* | 7/2019 | Wu | H04L 63/1408 |
| 10,375,095 | B1* | 8/2019 | Turcotte | H04L 63/1425 |
| 10,404,699 | B2* | 9/2019 | Duggana | H04L 63/10 |
| 10,776,489 | B2* | 9/2020 | Rajcan | G06F 9/4408 |
| 10,826,861 | B1* | 11/2020 | Borg | H04L 67/141 |
| 10,834,084 | B2* | 11/2020 | Ouellette | H04L 63/107 |
| 10,846,108 | B1* | 11/2020 | Chung | G06F 21/44 |
| 10,887,337 | B1* | 1/2021 | Kim | H04L 61/1433 |
| 10,911,546 | B1* | 2/2021 | Goswami | H04L 67/141 |
| 10,917,384 | B2* | 2/2021 | Pham | H04L 61/5014 |
| 10,922,401 | B2* | 2/2021 | Wang | G06F 21/6209 |
| 10,924,468 | B2* | 2/2021 | Suresh | H04L 67/131 |
| 11,003,470 | B1* | 5/2021 | Galea | G06F 9/45545 |
| 11,108,868 | B2* | 8/2021 | San | H04L 65/403 |
| 11,159,627 | B1* | 10/2021 | Pachkov | H04L 67/148 |
| 11,190,501 | B2* | 11/2021 | Balakrishnan | H04L 63/0807 |
| 11,303,633 | B1* | 4/2022 | Williams | H04L 63/20 |
| 2003/0043762 | A1* | 3/2003 | Pang | H04L 65/103 370/328 |
| 2003/0078965 | A1* | 4/2003 | Cocotis | H04L 63/029 709/203 |
| 2003/0079030 | A1* | 4/2003 | Cocotis | G06F 3/1226 709/229 |
| 2005/0114711 | A1* | 5/2005 | Hesselink | H04L 67/568 726/4 |
| 2005/0120082 | A1* | 6/2005 | Hesselink | H04L 63/0272 709/219 |
| 2005/0138186 | A1* | 6/2005 | Hesselink | H04L 67/125 709/208 |
| 2005/0144186 | A1* | 6/2005 | Hesselink | H04L 63/0209 |
| 2005/0144195 | A1* | 6/2005 | Hesselink | H04L 63/029 |
| 2005/0144200 | A1* | 6/2005 | Hesselink | H04L 63/0209 |
| 2005/0149481 | A1* | 7/2005 | Hesselink | H04L 63/0209 |
| 2005/0160264 | A1* | 7/2005 | Kuhn | H04L 63/045 713/168 |
| 2006/0031407 | A1* | 2/2006 | Dispensa | H04L 61/25 709/219 |
| 2006/0074618 | A1* | 4/2006 | Miller | G06F 11/3664 703/13 |
| 2007/0061460 | A1* | 3/2007 | Khan | H04L 63/029 709/225 |
| 2007/0061887 | A1* | 3/2007 | Hoover | H04L 45/745 726/26 |
| 2007/0250641 | A1* | 10/2007 | Flannery | H04L 67/54 709/248 |
| 2008/0282081 | A1* | 11/2008 | Patiejunas | H04L 63/164 713/153 |
| 2008/0313716 | A1* | 12/2008 | Park | G06F 21/604 726/4 |
| 2009/0013055 | A1* | 1/2009 | Hall, Jr. | H04L 67/125 709/208 |
| 2009/0024948 | A1* | 1/2009 | Anka | H04L 9/3239 715/771 |
| 2009/0327905 | A1* | 12/2009 | Mascarenhas | H04L 67/10 715/738 |
| 2010/0002066 | A1* | 1/2010 | Nelson | G11B 27/105 348/E7.083 |
| 2011/0145916 | A1* | 6/2011 | McKenzie | G06F 21/53 718/1 |
| 2011/0167475 | A1* | 7/2011 | Hoover | G06F 21/6218 726/3 |
| 2011/0251992 | A1* | 10/2011 | Bethlehem | H04L 67/141 707/610 |
| 2011/0258128 | A1* | 10/2011 | Hambleton | G06Q 30/02 705/308 |
| 2012/0054625 | A1* | 3/2012 | Pugh | G06F 21/41 715/736 |
| 2012/0272310 | A1* | 10/2012 | Souissi | H04L 67/565 726/15 |
| 2013/0238678 | A1* | 9/2013 | Bloom | G06F 16/183 707/827 |
| 2013/0263216 | A1* | 10/2013 | Vakil | H04L 65/403 726/3 |
| 2013/0297973 | A1* | 11/2013 | Hyland | G06F 11/28 714/27 |
| 2014/0018037 | A1* | 1/2014 | Shanmugavadivel | H04W 76/12 455/411 |
| 2014/0040993 | A1* | 2/2014 | Lorenzo | G06F 21/45 726/4 |
| 2014/0223520 | A1* | 8/2014 | Gafni | G06F 21/40 726/4 |
| 2015/0039483 | A1* | 2/2015 | Santarlas | G06Q 50/18 705/311 |
| 2015/0039908 | A1* | 2/2015 | Lee | G06F 21/35 713/193 |
| 2015/0148093 | A1* | 5/2015 | Huang | H04M 1/72409 29/428 |
| 2015/0235017 | A1* | 8/2015 | Oberheide | G06F 21/34 726/6 |
| 2015/0281322 | A1* | 10/2015 | Dingwell | G06F 21/00 715/740 |
| 2016/0173483 | A1* | 6/2016 | Wong | H04W 12/06 726/9 |
| 2016/0371099 | A1* | 12/2016 | Woog | H04L 69/28 |
| 2017/0093910 | A1* | 3/2017 | Gukal | H04L 63/1416 |
| 2017/0134423 | A1* | 5/2017 | Sysman | G06F 21/554 |
| 2017/0223046 | A1* | 8/2017 | Singh | H04L 63/1491 |
| 2017/0289191 | A1* | 10/2017 | Thioux | H04L 63/1441 |
| 2017/0302642 | A1* | 10/2017 | Hindocha | H04L 63/102 |
| 2018/0020005 | A1* | 1/2018 | Beiter | H04L 9/3213 |
| 2018/0077243 | A1* | 3/2018 | Mathew | H04L 67/143 |
| 2018/0322183 | A1* | 11/2018 | Feijoo | H04L 63/0815 |
| 2018/0359237 | A1* | 12/2018 | Shem Tov | H04L 63/1433 |
| 2019/0014181 | A1* | 1/2019 | Ramasamy | H04L 69/40 |
| 2019/0018719 | A1* | 1/2019 | Brin | G06F 9/547 |
| 2019/0036853 | A1* | 1/2019 | Denoue | G06F 40/174 |
| 2019/0075099 | A1* | 3/2019 | Brouchier | H04L 63/0853 |
| 2019/0311134 | A1* | 10/2019 | Mahaffey | H04W 12/02 |
| 2019/0318114 | A1* | 10/2019 | Holt | H04L 63/108 |
| 2019/0361694 | A1* | 11/2019 | Gordon | G06F 1/3231 |
| 2020/0004946 | A1 | 1/2020 | Gilpin et al. | |
| 2020/0293352 | A1* | 9/2020 | Foley | G06F 9/452 |
| 2020/0322327 | A1* | 10/2020 | Suresh | H04L 67/01 |
| 2020/0334698 | A1* | 10/2020 | Magazine | H04L 67/10 |
| 2020/0371822 | A1* | 11/2020 | Zhou | H04L 67/01 |
| 2020/0374284 | A1* | 11/2020 | Suresh | H04W 12/06 |
| 2021/0014317 | A1* | 1/2021 | Lv | H04L 67/563 |
| 2021/0021605 | A1* | 1/2021 | Innes | H04L 63/0823 |
| 2021/0027743 | A1* | 1/2021 | Lee | H04N 21/43615 |
| 2021/0092136 | A1* | 3/2021 | Woodworth | H04L 63/1416 |
| 2021/0099451 | A1* | 4/2021 | Will | H04L 63/108 |

(56) References Cited

U.S. PATENT DOCUMENTS

| | | | | |
|---|---|---|---|---|
| 2021/0099553 | A1* | 4/2021 | Grosjean | H04L 69/162 |
| 2021/0136101 | A1* | 5/2021 | Ben-Yosef | H04L 63/1433 |
| 2021/0160262 | A1* | 5/2021 | Bynum | H04L 43/16 |
| 2021/0218770 | A1* | 7/2021 | Ben-Yosef | G06F 16/9024 |
| 2021/0243027 | A1* | 8/2021 | Gupta | H04L 9/0825 |
| 2021/0336944 | A1* | 10/2021 | Brinckman | H04L 63/0815 |
| 2021/0337013 | A1* | 10/2021 | Krishnamurthy | H04L 67/02 |
| 2022/0050828 | A1* | 2/2022 | Wu | H04L 43/026 |
| 2022/0066798 | A1* | 3/2022 | Kelly | G06F 3/1462 |

OTHER PUBLICATIONS

Mogica "Remote Desktop: Integrating Mulitple Devices," Thesis, Stockholm Sweden, pp. 1-44, Nov. 29, 2008 (Year: 2008).*

Sharma "Remote System Controller: An Implementation of a Secure Channel," International Journal of Computer Science and Mobile Computing, A Monthly Journal of Computer Science and Information Technology, IJCS, vol. 2, Issue 4, Apr. 2013, pp. 414-421 (Year: 2013).*

Montoro "Remote Desktop Protocol,, the Good, the Bad and the Ugly," Security Advisory, May 28, 2005, pp. 1-4 (Year: 2005).*

Communication and Search Report issued by the European Patent Office in Application No. 21186783.3-1213, dated Jan. 24, 2022 (10 pages).

\* cited by examiner

NATIVE REMOTE ACCESS TO TARGET RESOURCES USING SECRETLESS CONNECTIONS

BACKGROUND

Organizations and individuals increasingly use remote network connections for accessing secure files and other network resources. For example, many organizations allow individuals to work collaboratively from different offices, from home office locations, or while travelling. As another example, individuals may use cloud-based servers for storing electronic files and may access these files through a remote connection. Thus, these remote connections provide improved flexibility, allowing users to access a network remotely as if their device was connected to the network directly. Although advantageous, these remote connections may present security vulnerabilities and are common targets for malicious actors to gain access to the secure network or user data.

Some existing techniques, such as virtual private networks (VPNs), require the installation of VPN clients, which can be cumbersome for users and often lead to increased operating expenditures for organizations. Further, VPNs often do not discriminate among target resources, and instead provide users with full access to the network. For this reason, VPN clients are common attack points for malicious users, who may target security vulnerabilities to gain access to secure networks and harvest user credentials or other sensitive data. Further, such VPN clients often require users to enter passwords specific to the VPN service, which increases the risk of credentials theft and deteriorates the user's experience. Other techniques, such as HTML5 gateway solutions, do not require the installation of VPN clients, but equally provide a poor user experience by requiring a browser-based session, rather than a native desktop client.

Some remote desktop gateway techniques allow for passwordless or multi-factor authentication, however, additional passwords may be required to access a particular target resource. Further, these remote desktop gateways often require a user to identify details of a target server (such as IP addresses, or port configurations), a domain username, or other sensitive information, which may create an attack vector for malicious actors.

Accordingly, in view of these and other deficiencies in existing techniques, technological solutions are needed for securely establishing passwordless and native remote access sessions. In particular, solutions should advantageously allow for the sessions to be established without requiring separate credentials. Further, technological solutions should allow native access without requiring a dedicated remote access client or other non-native software, such as a web-based interface. Solutions should also be dynamic, allowing secure connections to be established during a connection phase, without potentially exposing sensitive client information, such as usernames or other credentials, or sensitive target details, such as IP addresses or other information for the target host.

SUMMARY

The disclosed embodiments describe non-transitory computer readable media, systems, and methods for securely establishing secretless and remote native access sessions. For example, in an embodiment, a non-transitory computer readable medium may include instructions that, when executed by at least one processor, cause the at least one processor to perform operations for securely establishing secretless and remote native access sessions. The operations may comprise identifying a client configured to participate in remote native access sessions, wherein the client has a remote access protocol file that has been modified to include an identifier associated with the client; sending a prompt to the client to establish a secure tunnel connection with a connection agent using the identifier associated with the client; authenticating the client; accessing target identity information associated with one or more target resources; receiving from the client a token that identifies a target resource from among the one or more target resources; obtaining, based on the token, a credential required for secure access to the target resource; and initiating, using the credential, a remote native access session between the client and the target resource.

According to a disclosed embodiment, the remote access protocol file may be modified by the client.

According to a disclosed embodiment, the connection agent may replace a username in a request for the remote native access session with data from the token.

According to a disclosed embodiment, the credential may be obtained in a secretless manner from the perspective of the client.

According to a disclosed embodiment, the target identity information may be associated with a plurality of target resources.

According to a disclosed embodiment, the operations may further comprise receiving a selection by the client of the target resource from among the plurality of target resources.

According to a disclosed embodiment, the plurality of target resources may be identified based on access rights of the client.

According to a disclosed embodiment, the plurality of target resources may be identified based on the authentication of the client.

According to a disclosed embodiment, the remote access protocol file may be a remote desktop protocol.

According to a disclosed embodiment, the identifier associated with the client may be at least one of: a mobile telephone number, and email address, a user name, an account name, or a custom identifier created by the client.

According to another disclosed embodiment, there may be a computer-implemented method for securely establishing secretless and remote native access sessions. The method may comprise identifying a client configured to participate in remote native access sessions, wherein the client has a remote access protocol file that has been modified to include an identifier associated with the client; sending a prompt to the client to establish a secure tunnel connection with a connection agent using the identifier associated with the client; authenticating the client; accessing target identity information associated with one or more target resources; receiving from the client a token that identifies a target resource from among the one or more target resources; obtaining, based on the token, a credential required for secure access to the target resource; and initiating, using the credential, a remote native access session between the client and the target resource.

According to a disclosed embodiment, the credential may be obtained from a secure credentials vault.

According to a disclosed embodiment, the credential may be obtained without making the credential available to the client.

According to a disclosed embodiment, the credential may be obtained locally at the client, and deleted at the client upon termination of the remote native access session.

According to a disclosed embodiment, the target identity information may be associated a plurality of target resources.

According to a disclosed embodiment, the method may further comprise sending to the client data for generating a selectable menu of the plurality of target resources.

According to a disclosed embodiment, the selectable menu of the plurality of target resources may comprise icons and identifying data associated with the plurality of target resources.

According to a disclosed embodiment, the authentication of the client may be performed according to at least one of: OpenID or Security Assertion Markup Language.

According to a disclosed embodiment, the connection agent may be located in a local network in which the target resource is also located.

According to a disclosed embodiment, the connection agent may be located in a virtualized network in which the target resource is also located.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for securely establishing secretless and remote native access sessions described herein overcome several technological problems relating to security, efficiency, and functionality in the fields of cybersecurity and remote network access. In particular, the disclosed embodiments provide techniques for establishing secure remote access sessions in a passwordless manner using native desktop clients. As discussed above, many current remote access techniques present security vulnerabilities and inefficiencies both for users and for organizations. For example, virtual private networks (VPNs) and other connections often create attack vectors for malicious actors. In particular, VPN and other clients often use credentials, such as passwords, when establishing the connection, which may unnecessarily expose these credentials to attackers. Similarly, some techniques include sensitive information about the client or the host network in communications establishing the connection, which may also create vulnerabilities. Further, VPN clients and other techniques often allow broad access to a network which may increase the ability of attackers to access sensitive information or escalate privileges in the network.

The disclosed embodiments provide technical solutions to these and other problems with current techniques. In particular, the disclosed techniques do not require passwords or other credentials to be stored on the client device, or to be transmitted by the client to the target network system, thereby improving security in the network. Further, the disclosed techniques allow a remote access session to be established without identifying a particular target resource and without transmitting usernames or other sensitive information associated with the client during the connection phase. Rather, this information may be provided after the connection has been established and once a user has been authenticated. Moreover, the scope of access that a user may be granted can be narrowly tailored based on permissions associated with the user or the current access requirements of the user. For these, and other reasons that will be apparent to those skilled in the art, the disclosed techniques provide improved security over existing techniques.

Further, the disclosed techniques do not require a dedicated agent or client to be installed on, a client device for establishing the secure connection other than software components that are native to the device and/or the operating system. For example, the remote access may be established using a standard remote desktop protocol, without the need for a VPN client, a web-based portal, or other non-native software. This not only improves the experience for the user, but can provide increased flexibility in the types of devices that can access the network, and can also reduce overhead costs associated with maintenance and troubleshooting of a dedicated client.

Reference will now be made in detail to the disclosed embodiments, examples of which are illustrated in the accompanying drawings.

Figure 1:
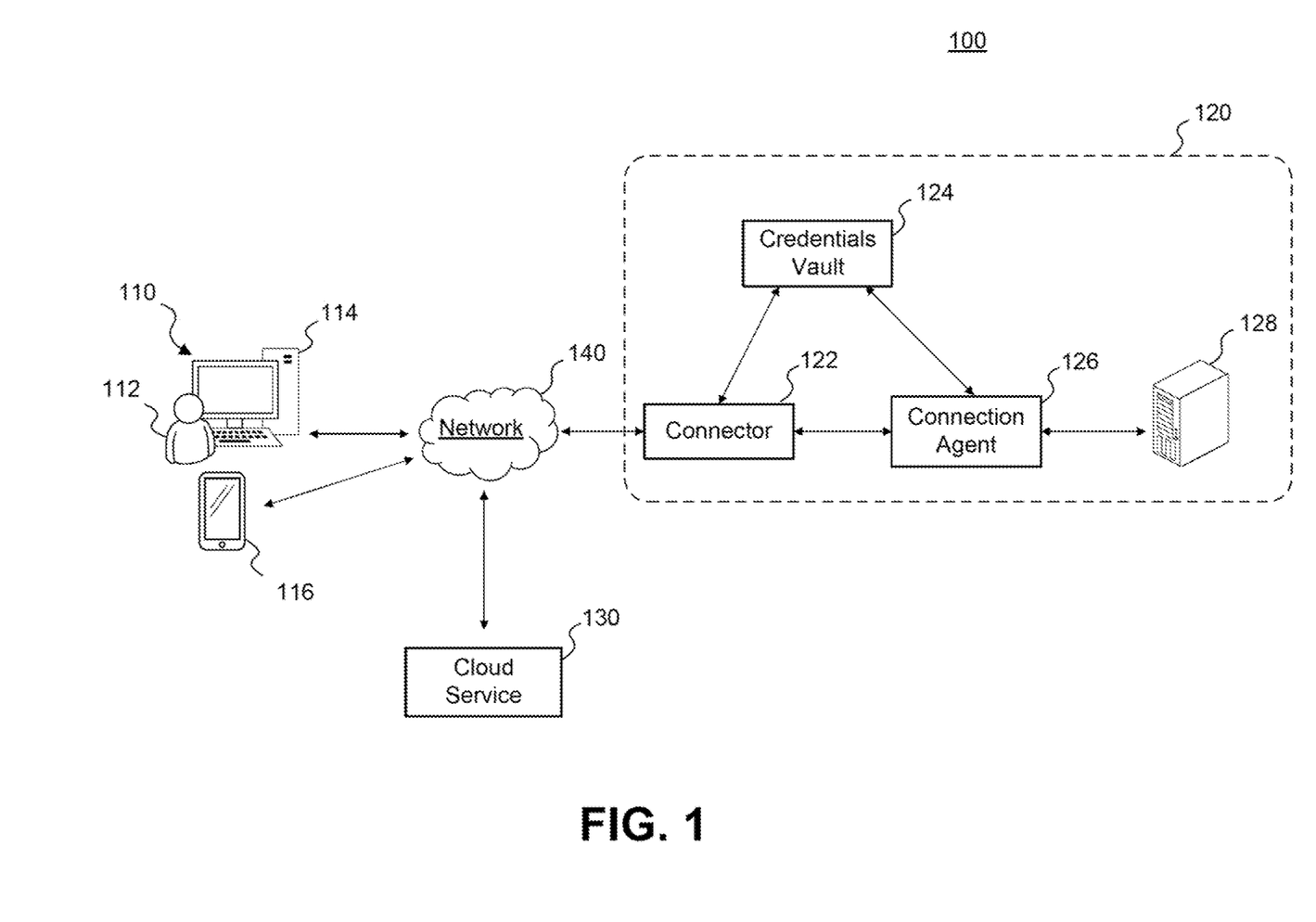
FIG. 1 illustrates an example system environment for providing native remote access to target resources, consistent with the disclosed embodiments.

FIG. 1 illustrates an example system environment 100 for providing native remote access to target resources, consistent with the disclosed embodiments. System environment 100 may include one or more client identities 110, one or more mobile devices 116, a client system 120, and one or more cloud services 130, as shown in FIG. 1. Client system 120 may comprise, among other things, a connector 122, a credentials vault 124, a connection agent 126, and one or more target resources 128. System environment 100 may represent a system or network environment in which client identity 110 requests access to target resource 128 remotely. System environment 100 may be configured to provide client identity 110 access to target resource 128 using native web applications (i.e., without requiring a dedicated application, webpage, etc.) and without requiring separate credentials. Further details regarding this system are provided below.

The various components of system 100 may communicate over a network 140. Such communications may take place across various types of networks, such as the Internet, a wired Wide Area Network (WAN), a wired Local Area Network (LAN), a wireless WAN (e.g., WIMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

Client identity 110 may refer to any identity that may access files associated with target resource 128. In some embodiments, client identity 110 may refer to a particular user or account (e.g., data and/or instructions representing an individual or service account). For example, client identity 110 may include a user 112 associated with one or more credentials for accessing target resource 128. In some embodiments, client identity 110 may include a client device 114 through which user 112 may access target resource 128. For example, client device 114 may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may engage in remote access to target resource 128. In some embodiments, client identity 110 may be a virtual machine (e.g., based on AWS™, Azure™, IBM Cloud™, etc.), container instance (e.g., Docker™ container, Java™ container, Windows Server™ container, etc.), or other virtualized instance. In some embodiments, client identity 110 may be a software instance or application executing on client device 114. Using the disclosed methods, client identity 110 may access target resource 128 remotely without the need for specific credentials, a VPN, a dedicated agent, etc. As used herein, a "client" may refer collectively to client identity 110, to user 112, an account associated with user 112, or to client device 114.

In some embodiments, client identity 110 may be authorized through system environment 100 using a multi-factor authentication process. This may include authenticating client identity 110, at least in part, through verifying an object in the possession of user 112. Accordingly, system environment 100 may further include a device, such as mobile device 116, for authenticating client identity 110. Mobile device 116 may include any computing device associated with user 112 that is separate from client device 114. For example, mobile device 116 may include a mobile phone, a tablet, a wearable device (e.g., a smart watch, smart jewelry, implantable device, fitness tracker, smart clothing, head-mounted display, etc.). In some embodiments, mobile device 116 may be configured to receive push notifications or other electronic communications requesting authentication of client identity 110. Further, mobile device 116 may include a display configured to display graphical user interfaces for selecting accounts and/or target resources, or performing other functions associated with the disclosed techniques.

Client identity 110 and/or mobile device 116 may communicate with client system 120 through network 140. Client identity 110 may be configured to participate in remote native access sessions with client system 120 for accessing target resource 128. As used herein, a remote native access session may refer to any network-based remote connection that is accessed through native software and components of the client device 114. In some embodiments, the remote native access session may be a remote desktop connection. Accordingly, the native software may include a remote desktop client that is not specific to client system 120 or cloud service 130. For example, the remote desktop client may include a client integral to an operating system of client device 114, such as a Microsoft™ remote desktop protocol (RDP) client, or similar RDP clients. Accordingly, the remote native access session may be accessed without the need for a dedicated client (e.g., a VPN client), a webpage browser (e.g., through a web portal, an HTML5 gateway, etc.), or the like.

Further, the remote native access session may be dynamic. As used herein, a dynamic connection may be one that is established without initially identifying one or more aspects of the remote access connection. For example, during the connection phase, the account accessing the connection, the target resource (e.g., the target IP address, etc.), the connecting tool (e.g., which application is used), or various other aspects may not be defined. Rather, these or other aspects may be defined after the connection has been established, and potentially after the client identity has been authenticated. In some embodiments, user 112 may specify these aspects over the native connection using client device 114, mobile device 116, or through other methods. Additional details regarding the remote native access session are described below with respect to FIG. 3.

As shown in FIG. 1, client system 120 may include a connector 122. Connector 122 may be a component of client system 120 responsible for receiving requests for remote access sessions. Connector 122 may process these requests and perform additional interfacing steps between client device 114, mobile device 116, cloud service 130, and/or components of client system 120. Connector 122 may be a dedicated server, service, or software component of client system 120, or may be integrated with one or more other components of client system 120.

In some embodiments, client system 120 may further include, or have external access to, a credentials vault 124. Credentials vault 124 may be any form of storage location containing credentials (such as usernames, tokens, passwords, etc.) associated with client system 120 (e.g., CyberArk Enterprise Password Vault™). In particular, credentials vault 124 may store credentials required to access target resource 128. For example, as discussed further below, in situations where client identity 110 has been successfully authenticated, connector 122 and/or connection agent 126 may fetch a secret (e.g., authentication key, credential, token, password, etc.) from credentials vault 124 for authentication of client identity 110 (or a corresponding identity or account) to the appropriate target resource 128. In some embodiments the secrets stored within credentials vault 124 may not be provided to client identity 110. Accordingly, user 112 may be authenticated in a passwordless manner to access target resource 128. In some embodiments, credentials vault 124 may be omitted and the credentials may be stored locally in client system 120, on client device 114 or mobile device 116.

Client system 120 may further include a connection agent 126, as shown in FIG. 1. Connection agent 126 may be a separate component (e.g., a separate software component, a separate server, etc.) or may be integrated with one or more other components of client system 120, such as connector 122. Connection agent 126 may perform tasks associated with establishing a remote access session as described above. Connection agent 126 may further obtain credentials for client identity 110, for example through credentials vault 124. Additional details regarding these and other actions that may be performed by connection agent 126 are provided below with respect to FIG. 3.

Client system 120 may further include, or have external access to, a target resource 128. As used herein, a target resource may refer to any resource within a network that may accessed by client system 120 remotely. Examples of network resources may include SQL servers, databases or data structures holding confidential information restricted-use applications, operating system directory services, access-restricted cloud-computing resources (e.g., an AWS™ or Azure™ server), sensitive IoT equipment (e.g., physical access control devices, video surveillance equipment, etc.), and/or any other computer-based equipment or software that may be accessible over a network.

In some embodiments, target resource 128 may be a privileged resource, such that access may be limited or restricted. For example, access to the requested resource may require a privileged credential (e.g., a password, a username, an SSH key, an asymmetric key, a security or access token, etc.), membership in a privileged access group (e.g. Microsoft Active Directory™ group, AWS Identity and Access Management™ group, etc.), or other form of privileged access rights. In some embodiments, credentials vault 124 may store privileged credentials required for accessing target resource 128, as described above.

In some embodiments, system environment 100 may include a cloud service 130, as shown in FIG. 1. Cloud service 130 may be a cloud-based service configured to perform tasks associated with facilitating the connection between client device 114 (and/or mobile device 116) and client system 120. For example, cloud service 130 may be configured to receive or intercept access requests from client device 114 and may route them to connector 122. Additional details regarding these and other actions that may be performed by service 130 are described below with respect to FIG. 3.

Figure 2:
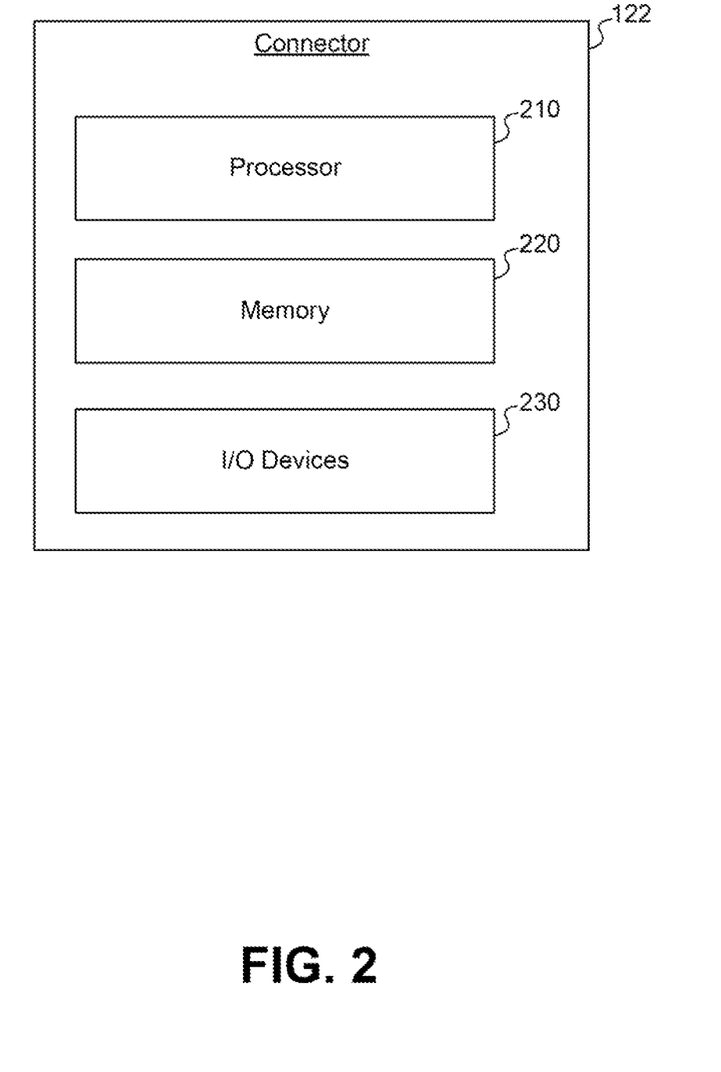
FIG. 2 is a block diagram showing an example computing system, consistent with the disclosed embodiments.

FIG. 2 is a block diagram showing an example connector 122, consistent with the disclosed embodiments. As described above, connector 122 may be a computing device (e.g., a server, etc.) and may include one or more dedicated processors and/or memories. For example, connector 122 may include a processor (or multiple processors) 210, a memory (or multiple memories) 220, and/or one or more input/output (I/O) devices 230, as shown in FIG. 2. In some embodiments, connector 122 may be integrated with one or more other components of client system 120. For example, processor 210 and/or memory 220 may also be associated with credentials vault 124, connection agent 126, and/or target resource 128.

Processor 210 may take the form of, but is not limited to, a microprocessor, embedded processor, or the like, or may be integrated in a system on a chip (SoC). Furthermore, according to some embodiments, processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any type of processor configured in client system 120.

Memory 220 may include one or more storage devices configured to store instructions used by the processor 210 to perform functions related to client system 120. The disclosed embodiments are not limited to particular software programs or devices configured to perform dedicated tasks. For example, the memory 220 may store a single program, such as a user-level application, that performs the functions associated with the disclosed embodiments, or may comprise multiple software programs. Additionally, the processor 210 may, in some embodiments, execute one or more programs (or portions thereof) remotely located from connector 122. Furthermore, memory 220 may include one or more storage devices configured to store data for use by the programs. Memory 220 may include, but is not limited to a hard drive, a solid state drive, a CD-ROM drive, a peripheral storage device (e.g., an external hard drive, a USB drive, etc.), a database, a network drive, a cloud storage device, or any other storage device.

I/O devices 230 may include one or more network adaptors or communication devices and/or interfaces (e.g., WIFI, BLUETOOTH, RFID, NFC, RF, infrared, Ethernet, etc.) to communicate with other machines and devices, such as with other components of system environment 100 through network 140. For example, client system 120 may use a network adaptor to receive and transmit communications pertaining to access requests within system environment 100. In some embodiments, I/O devices 230 may also include interface devices for interfacing with a user of client system 120. For example, I/O devices 230 may comprise a display, touchscreen, keyboard, mouse, trackball, touch pad, stylus, printer, or the like, configured to allow a user to interact with client system 120.

Figure 3:
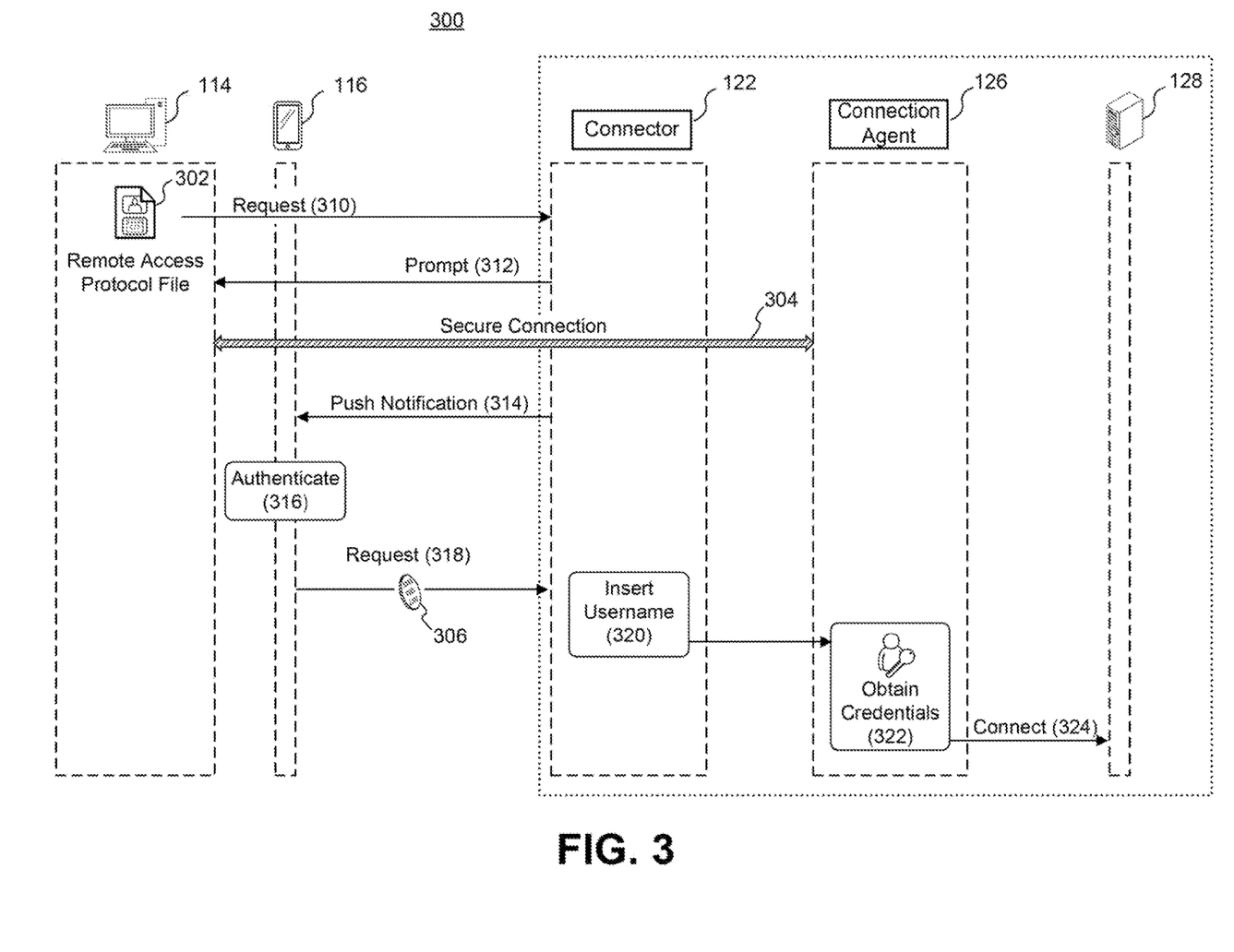
FIG. 3 is a block diagram illustrating an example process for providing native remote access to target resources, consistent with the disclosed embodiments.

FIG. 3 is a block diagram illustrating an example process 300 for providing native remote access to target resources, consistent with the disclosed embodiments. Process 300 may allow a client, such as client identity 110, to establish a secure connection 304 with client system 120 for accessing target resource 128. As used herein, accessing the target resource 128 may include any operations by a client device involving data or information stored on target resource 128. For example, this may include reading information stored on target resource 128, storing information on target resource 128, deleting or modifying information on target resource 128, or any other forms of operations requiring access to the target resource. In some embodiments, access may be restricted to privileged client identities, as discussed above.

As part of process 300, client device 114 may transmit a request step 310 for accessing target resource 128 of client system 120. In some embodiments, client device 114 may access a remote access protocol file 302. This remote access protocol file 302 may include information for establishing secure connection 304. In particular, remote access protocol file 302 may include information identifying client identity 110 (e.g., an account associated with user 112, etc.) and information identifying a target host for the connection (e.g., connector 122, credentials vault 124, and/or connection agent 126). For example, this information may be represented as an address for a target host, which may include a server name indication (SNI) as part of a transport layer security (TLS) protocol, or any other suitable form of address. In some embodiments, remote access protocol file 302 may be a proprietary protocol file, such as a remote desktop protocol (RDP) file associated with Windows Remote Desktop™, or the like. Of course, remote access protocol file 302 may correspond to other protocols as well. Accordingly, client device 114 may send the request in step 310 using native remote access software, without the need for a VPN client, a browser-based interface, or other non-native software.

In the example of an SNI address, the remote access protocol file 302 may be presented in the form userID.address, where userID is a prefix added to the target host address. In some embodiments, the user ID may be a personal telephone number (e.g., mobile number), or other identifier associated with user 112. In some embodiments, process 300 may include a step of modifying the address within remote access protocol file 302 to include the user ID. For example, user 112 may manually modify the address to include a phone number or other identifier associated with user 112 through a text-based file editor, a graphical user interface, a mobile application, or any other suitable interface. In other embodiments, the user ID may be automatically added, for example, by client device 114, by cloud service 130, or other components of system environment 100. While the userID.address format is provided by way of example, any other suitable formats may be used for representing the user information and the address within remote access protocol file 302. For example, the user ID may be included in a designated field, appended as a suffix to the address, or otherwise included in the file.

Notably, in some embodiments, remote access protocol file 302 and the request of step 310 may not include credentials required to access target resource 128 and may not specifically identify target resource 128. In such embodiments, secure connection 304 may be dynamic in that the connection may be established initially and the details regarding the specific target resource and the user's credentials may be determined subsequently, as described further below. For example, remote access protocol file 302 may include fields or designated spaces for a username and password or other credentials of client identity 110. These fields or spaces may be empty, may include a default text (e.g., "BLANK"), or may include an identifier for identifying the credential fields in later stages. Omitting the user's credentials in this way may improve security by eliminating a potential for the user's credentials to be stolen or otherwise obtained by an attacker. Further, process 300 would not require user 112 to enter separate credentials for accessing client system 120. Thus process 300 allows for a passwordless remote connection to target resource 128. Additional details regarding the authentication of client identity 110 are provided below.

Remote access protocol file 302 may be accessed by client identity 110 in various ways. For example, remote access protocol file 302 may be stored in a memory of client device 114, such as on a local hard drive, a solid state drive, a removable drive, or the like. In some embodiments, remote access protocol file 302 may be stored externally. For example, remote access protocol file 302 may be stored on a cloud-based platform (e.g., in cloud service 130, or other cloud locations), on a remote server, on a separate computing device, or the like. In some embodiments, cloud service 130 may generate remote access protocol file 302 and provide it to client identity 110 for accessing client system 120 and/or other systems.

In some embodiments, the request in step 310 may not be transmitted directly to connector 122. For example, user device 114 may transmit the request to cloud service 130, which may route the request to the correct target host based on the address included in remote access protocol file 302. This may include, for example, extracting the SNI address described above and mapping it, to the appropriate connector. Accordingly, cloud service 133 may include or may have access to a database of connector network addresses, connector identifiers, and/or other information to facilitate routing requests in step 310.

In step 312, connector 122 may send a prompt to client device 114 to establish a secure connection 304 with connection agent 126. For example, secure connection 304 may be a tunnel connection, such as a connection using the TLS protocol, or a similar connection protocol. While TLS is used by way of example, it is to be understood that various other forms of secure connections may be used and the present disclosure is not limited to any particular connection protocol or configuration. Further, while secure connection 304 is shown between client device 116 and connection agent 116, the connection may be with any component or subcomponent of client system 120, including connector 122.

Once the connection has been successfully tunneled, connector 122 may generate and send a push notification in step 314. The push notification may be received through a mobile application on mobile device 116. Through the push notification, user 112 may be prompted for authentication and target account selection. Authentication step 316 may occur in a variety of ways. In some embodiments, authentication may occur by virtue of user 112 having mobile device 116 in his or her possession. Accordingly, the push notification transmitted in step 314, along with the identification of the user in the request in step 310, may provide multi-factor authentication for client identity 110. In some embodiments, additional authentication may be performed, such as biometric authentication (e.g., a retinal scan, facial recognition, a fingerprint scan, a voiceprint identification, etc.), a user pin, a password, scanning a QR code, or the like. According to some embodiments of the present disclosure, an authentication protocol, such as OpenID or Security Assertion Markup Language (SAML), may be used in step 316.

Through mobile device 116, user 112 may also select an account for accessing target resource 128. In some embodiments, the account may be selected automatically. For example, user 112 may be associated with only one account, or may have a preferred or default account that is selected. In other embodiments, user 112 may select from a plurality of accounts through a user interface.

Figure 4:
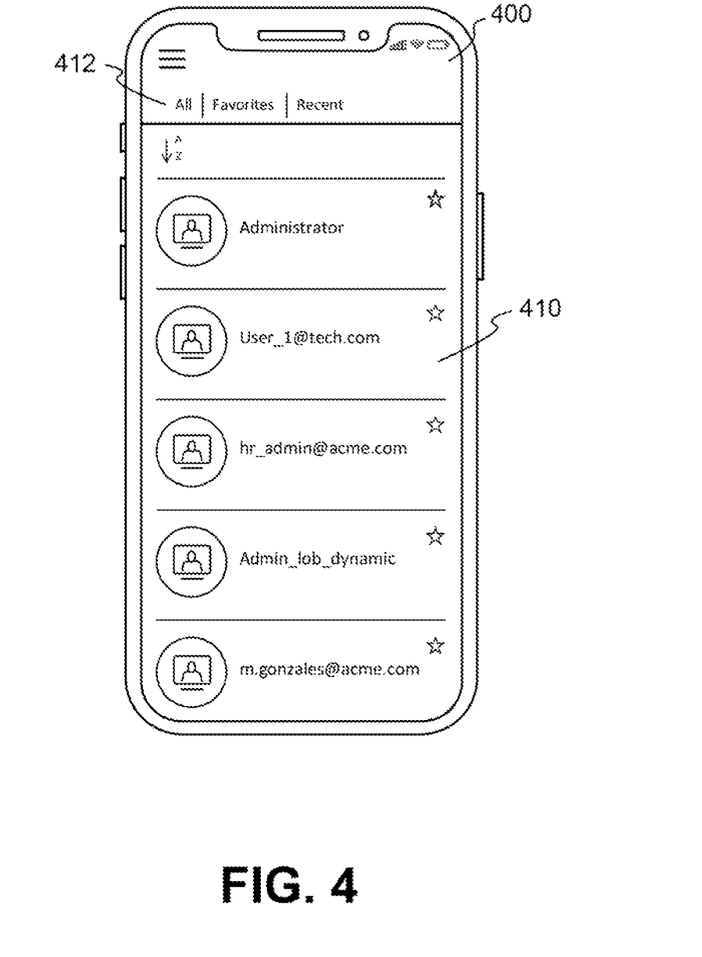
FIG. 4 illustrates an example user interface for selecting an account, consistent with the disclosed embodiments.

FIG. 4 illustrates an example user interface 400 for selecting an account, consistent with the disclosed embodiments. User interface 400 may be displayed, for example, on mobile device 116 and may be associated with a mobile application. As shown in FIG. 4, user interface 400 may present a plurality of accounts, such as account 410, that the user may select through the display of mobile device 116. User interface 400 may further include filters or other options for configuring the display of the available accounts. For example, user interface 400 may include filters 412 for filtering or sorting by accounts designated as favorites, recent accounts selected by user 112, or various other attributes. User interface 400 is shown by way of example, and various other configurations or formats may be used. In some embodiments, the user interface 400 may be presented through a separate device such as client device 114, or another device accessible by user 114 (e.g., a laptop computer, a tablet, a smartwatch, etc.).

Returning to FIG. 3, process 300 may include a step 318 for transmitting a request to connector 112 for accessing target resource 128. This request may include a token 306, that is provided to connector 122. In some embodiments, token 306 may be a temporary token generated by mobile device 116 for one-time access to client system 120. In some embodiments, token 306 may be generated by another device or service, such as cloud service 130. In some aspects of the present disclosure, token 306 may further be valid only for a limited period of time.

Token 306 may include an identifier of target resource 128. For example, client system 120 may include a plurality of target resources associated with target identity information, and token 306 may identify target resource 128 from among the plurality of target resources. The target identity information may be stored locally within client system 120 (e.g., in memory 220) or in an external storage location (e.g., a remote server, a cloud-based platform, etc.).

In step 320, connector 122 may then modify the request to include a username based on token 306. In some embodiments, this may include intervening in the remote desktop protocol to replace the remote desktop username in the request of step 310 with token 306. For example, as described above, remote access protocol file 302 may include a username field that is blank, or that has a placeholder or default value. Accordingly, step 320 may include inserting the blank username or replacing the placeholder with token 306, which will serve as the username for accessing target resource 128. Therefore, the connection may be established initially without requiring the username to be included in the request of step 310.

In step 322, connection agent 126 may receive credentials associated with token 306. In some embodiments, the credentials may be received from credentials vault 124. For example, connection agent 126 may receive token 306 and may use token 306 to retrieve credentials corresponding to account 410 selected by user 112. Connection agent 126 may then assert the retrieved credentials at target resource 128 on behalf of client identity 110, as shown in step 324. Accordingly, client identity 110 may access target resource 128 without receiving the credentials from credentials vault 130, which may reduce security vulnerabilities in system environment 110 by preventing them from being exposed to attackers. Further, a separate password is not required for accessing target resource 128 through the remote access protocol used by client device 114. Access can also be granted without the need for a dedicated client, such as a VPN client, a browser-based interface, or other non-native system components.

In some embodiments, steps 322 and 324 may be performed without connection agent 126. For example, connector 122 may access the credentials of step 322 directly from credentials vault 124, without, connection agent 126, and may further assert the credentials on behalf of client identity 110. In some embodiments, the credentials may not be retrieved by connector 122 or connection agent 126, but may be provided by client device 114. For example, the credentials may be stored locally (e.g., in a cache, etc.) on client device 114. In some embodiments, client identity 110 may receive the credentials after they are obtained in step 322. For example, after step 322, connection agent 126 and/or connector 122 may transmit the obtained credentials to client device 114 and/or mobile device 116.

Figure 5:
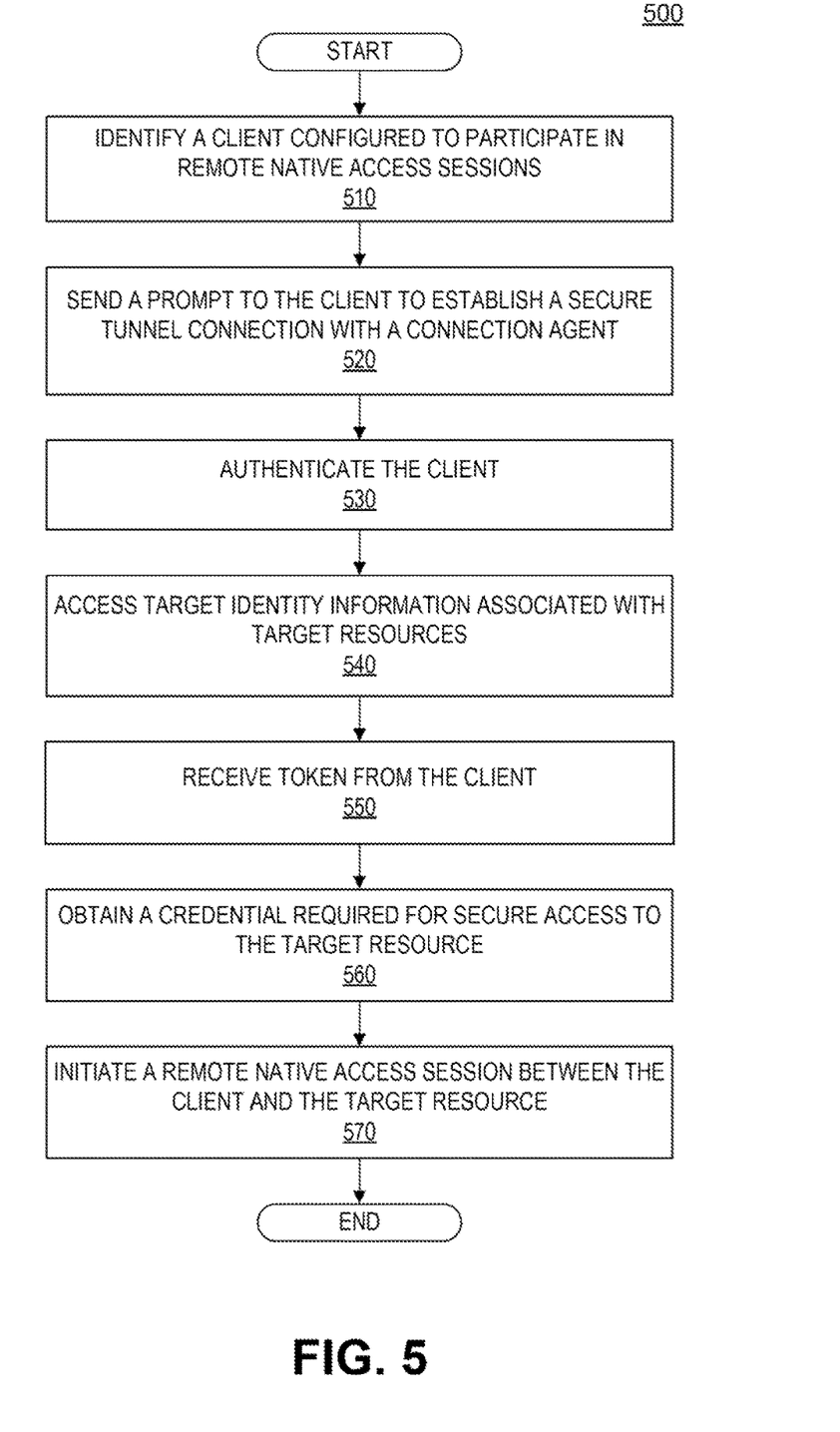
FIG. 5 is a flowchart depicting an example process for securely establishing secretless and remote native access sessions, consistent with the disclosed embodiments.

FIG. 5 is a flowchart depicting an example process 500 for securely establishing secretless and remote native access sessions, consistent with the disclosed embodiments. Process 500 may be performed by at least one processing device, such as processor 210 of connector 122, as described above. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 500. Further, process 500 is not necessarily limited to the steps shown in FIG. 5, and any steps or processes of the various embodiments described throughout the present disclosure may also be included in process 500, including those described above with respect to FIG. 3.

In step 510, process 500 may include identifying a client configured to participate in remote native access sessions. For example, step 510 may identify client identity 110 and thus the client may include user 112, an account associated with user 112, and/or client device 114. The client may be identified in various ways. In some embodiments, the client may be identified based on a request received from client device 114, as shown in step 310 of FIG. 3. In some embodiments, the client may have a remote access protocol file that has been modified to include an identifier associated with the client. For example, the client may access remote access protocol file 302, as discussed above, which may have been modified to include at least one of a mobile telephone number, an email address, a user name, an account name, a custom identifier created by the client, a random or semi-random identifier, a customer number, an IP address, or various other identifiers that may be associated with the client. The remote access protocol file 302 may be modified by the client or may be modified by other components of system environment 100, including cloud service 130. In some embodiments, the client may be identified by cloud service 130 as described above. For example, cloud service 130 may extract an address (e.g., an SNI indicating a hostname) from a request from client identity 110 and may route the request based on the address. In some embodiments, the remote access protocol file 302 may comply with a remote desktop protocol, as described above.

In step 520, process 500 may include sending a prompt to the client to establish a secure tunnel connection with a connection agent using the identifier associated with the client. For example, step 520 may correspond to step 312 for establishing secure connection 304 with connection agent 126, as described above with respect to FIG. 3. The secure tunnel connection may include any form of secure connection according to a tunneling protocol, including, but not limited to TLS, IP in IPv4/IPv6, Generic Routing Encapsulation (GRE), Secure Socket Tunneling Protocol (STTP), Internet Protocl Security (IPSec), Layer 2 Tunneling Protocol (L2TP), Virtual Extensible Local Area Network (VXLAN), or the like. As shown in FIG. 1, connection agent 126 and target resource 128 may be included in the same client system 120. Accordingly, the connection agent may be located in a local network, a virtual network, or other form of network in which the target resource 128 is also located.

In step 530, process 500 may include authenticating the client, which may be performed in various ways. For example, authentication of the client may be performed according to at least one of OpenID, SAML, or similar authentication protocols. In some embodiments, step 530 may include sending a push notification to a mobile device associated with the client. For example, mobile device 116 may receive a push notification as shown in step 314 and described above. Accordingly, the mobile device 116 may be configured to authenticate the client through an application on mobile device 116.

In step 540, process 500 may include accessing target identity information associated with one or more target resources. For example, client system 120 may include a plurality of target resources, including target resource 128, each which may be associated with target identity information. This target identity information may be stored, for example, in a database, a memory device (e.g., memory device 220), on a remote server or cloud-storage platform, or various other storage locations. In some embodiments, the plurality of target resources may be identified based on the identified client. For example, the plurality of target resources are identified based on access rights of the client, or based on the authentication of the client.

In step 550, process 500 may include receiving from the client a token that identifies a target resource from among the one or more target resources. For example, step 550 may include receiving token 306, as described above with respect to FIG. 3. In some embodiments, the target resource 128 may be selected by a user. Accordingly, process 500 may further include receiving a selection by the client of the target resource 128 from among the plurality of target resources. In some embodiments, the selection may be made through a graphical user interface, similar to user interface 400 shown in FIG. 4. For example, process 500 may further comprise sending to the client data for generating a selectable menu of the plurality of target resources. The selectable menu of the plurality of target resources comprises icons and identifying data associated with the plurality of target resources.

In step 560, process 500 may include obtaining, based on the token, a credential required for secure access to the target resource. For example, step 560 may comprise obtaining credentials associated with the target resource 128 identified in the token. As described above with respect to FIG. 3, the credential may be obtained from a secure credentials vault, such, as credentials vault 124. Accordingly, the credential may be obtained without making the credential available to the client. In other embodiments, the credential may be obtained locally at the client, and deleted at the client upon termination of the remote native access session. As described above with respect to step 322, in some embodiments, the credential may be obtained in a secretless manner from the perspective of the client. Accordingly, the client may not be required to submit the credential or other credentials for accessing the target resource 128. In some embodiments, process 500 may further include replacing a username in a request for the remote native access session with data from the token. For example, process 500 may include inserting the token or data from the token into the remote access protocol file associated with the client. Alternatively, this may be performed by connection agent 126, or other components of client system 120.

At step 570, process 500 may include initiating, using the credential, a remote native access session between the client and the target resource. Accordingly, process 500 may allow the client to access the target resource in a passwordless manner (and without requiring transmission of other forms of secure credentials) and may be done through native remote protocol software (e.g., without requiring a separate agent or non-native software). As discussed above, the remote native access session may comply with various different remote access protocols and techniques.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely establishing secretless and remote native access sessions, the operations comprising:
   identifying a client configured to participate in a remote native access session with a target resource, the target resource requiring a credential for secure access by the client, wherein the client has a remote access protocol file including information for establishing a secure tunnel connection using a native remote access client without using the credential, wherein the remote access protocol file includes:
      an indication of a target host associated with the target resource, wherein the indication of the target host is modified to include an identifier associated with the client, the identifier being distinct from the credential; and
      at least one of a field or a designated space for the credential, the field or the designated space being blank or including default text other than the credential;

sending a prompt to the client to establish the secure tunnel connection with a connection agent using the identifier associated with the client;

authenticating the client using a mobile device associated with the client;

accessing target identity information associated with one or more target resources;

receiving from the client, via the secure tunnel connection, a request to access the target resource, the request including a token, the token identifying the target resource from among the one or more target resources based on a selection of the target resource through the mobile device;

obtaining the credential based on the token and an account selected by a user through the mobile device, wherein obtaining the credential includes accessing the credential from a credentials vault; and initiating, using the credential, a remote native access session between the client and the target resource.

2. The non-transitory computer readable medium of claim 1, wherein the indication of the target host is modified by the client.

3. The non-transitory computer readable medium of claim 1, wherein the credential is obtained in a secretless manner from the perspective of the client.

4. The non-transitory computer readable medium of claim 1, wherein the one or more target resources are identified based on access rights of the client.

5. The non-transitory computer readable medium of claim 1, wherein the one or more target resources are identified based on the authentication of the client.

6. The non-transitory computer readable medium of claim 1, wherein the remote access protocol file is a remote desktop protocol.

7. The non-transitory computer readable medium of claim 1, wherein the credential includes at least one of a username, an SSH key, an access token, a security token, or a password and the identifier associated with the client is at least one of: a mobile telephone number, an email address, or a custom identifier created by the client.

8. A computer-implemented method for securely establishing secretless and remote native access sessions, the method comprising:

identifying a client configured to participate in a remote native access session with a target resource, the target resource requiring a credential for secure access by the client, wherein the client has a remote access protocol file including information for establishing a secure tunnel connection using a native remote access client without using the credential, wherein the remote access protocol file includes:

an indication of a target host associated with the target resource, wherein the indication of the target host is modified to include an identifier associated with the client, the identifier being distinct from the credential; and at least one of a field or a designated space for the credential, the field or the designated space being blank or including default text other than the credential;

sending a prompt to the client to establish the secure tunnel connection with a connection agent using the identifier associated with the client;

authenticating the client using a mobile device associated with the client;

accessing target identity information associated with one or more target resources;

receiving from the client, via the secure tunnel connection, a request to access the target resource, the request including a token, the token identifying the target resource from among the one or more target resources based on a selection of the target resource through the mobile device;

obtaining the credential based on the token and an account selected by a user through the mobile device, wherein obtaining the credential includes accessing the credential from a credentials vault; and initiating, using the credential, a remote native access session between the client and the target resource.

9. The computer-implemented method of claim 8, wherein the credential is obtained without making the credential available to the client.

10. The computer-implemented method of claim 8, further comprising sending to the client data for generating a selectable menu of the one or more target resources, the target resource being selected through the selectable menu.

11. The computer-implemented method of claim 10, wherein the selectable menu of the one or more target resources comprises icons and identifying data associated with the one or more target resources.

12. The computer-implemented method of claim 8, wherein the authentication of the client is performed according to at least one of: OpenID or Security Assertion Markup Language.

13. The computer-implemented method of claim 8, wherein the connection agent is located in a local network in which the target resource is also located.

14. The computer-implemented method of claim 8, wherein the connection agent is located in a virtualized network in which the target resource is also located.

* * * * *